United States Patent [19]

Hynes et al.

[11] 3,797,864
[45] Mar. 19, 1974

[54] COMBINED METAL AND ELASTOMER SEAL

[75] Inventors: Joseph H. Hynes, Ojai; Arthur P. Ortolon, Jr., Oxnard, both of Canada

[73] Assignee: Vetco Offshore Industries, Inc., Ventura, Calif.

[22] Filed: Oct. 28, 1971

[21] Appl. No.: 193,312

[52] U.S. Cl............ 285/140, 285/338, 285/379, 166/88
[51] Int. Cl............................................. F16l 21/00
[58] Field of Search .......... 285/140, 139, 379, 338, 285/18; 277/116.2, 116.8, 188; 166/187, 196

[56] References Cited
UNITED STATES PATENTS

| 3,075,584 | 1/1963 | Brown | 166/196 X |
| 3,169,579 | 2/1965 | Haines | 166/196 X |
| 3,374,838 | 3/1968 | Current | 166/196 X |
| 3,392,785 | 7/1968 | King | 166/196 |
| 3,468,558 | 9/1969 | Ahlstone | 285/18 |
| 3,663,043 | 2/1970 | Walton | 285/379 X |
| 2,075,947 | 4/1937 | Kennedy | 277/188 X |
| 2,139,207 | 12/1938 | Rector | 285/140 X |
| 2,885,009 | 5/1959 | Baker | 277/188 X |
| 2,921,632 | 1/1960 | Clark | 277/188 X |
| 3,098,660 | 7/1963 | Hausner | 277/188 X |
| 3,222,089 | 12/1965 | Otteman | 285/18 |
| 3,273,646 | 9/1966 | Walker | 285/140 X |

FOREIGN PATENTS OR APPLICATIONS
506,965 11/1954 Canada ..................... 277/188

Primary Examiner—Jordan Franklin
Assistant Examiner—Wayne L. Shedd
Attorney, Agent, or Firm—Bernard Kriegel

[57] ABSTRACT

A well casing hanger is provided with a seal deformable into sealing engagement with opposed cylindrical walls of the casing hanger body and another body upon axial compression of the seal. The seal is compound and includes metallic end rings on a cylindrical elastomeric body, the end rings having marginal lips which are deformed oppositely into metal-to-metal sealing engagement with the cylindrical walls and form a seal closing the peripheral gap between the end rings and the cylindrical walls. The elastomeric body is also deformed into sealing engagement with the cylindrical walls and confined by the metallic lips against extruding between the end rings and the cylindrical walls.

6 Claims, 4 Drawing Figures

PATENTED MAR 19 1974 3,797,864

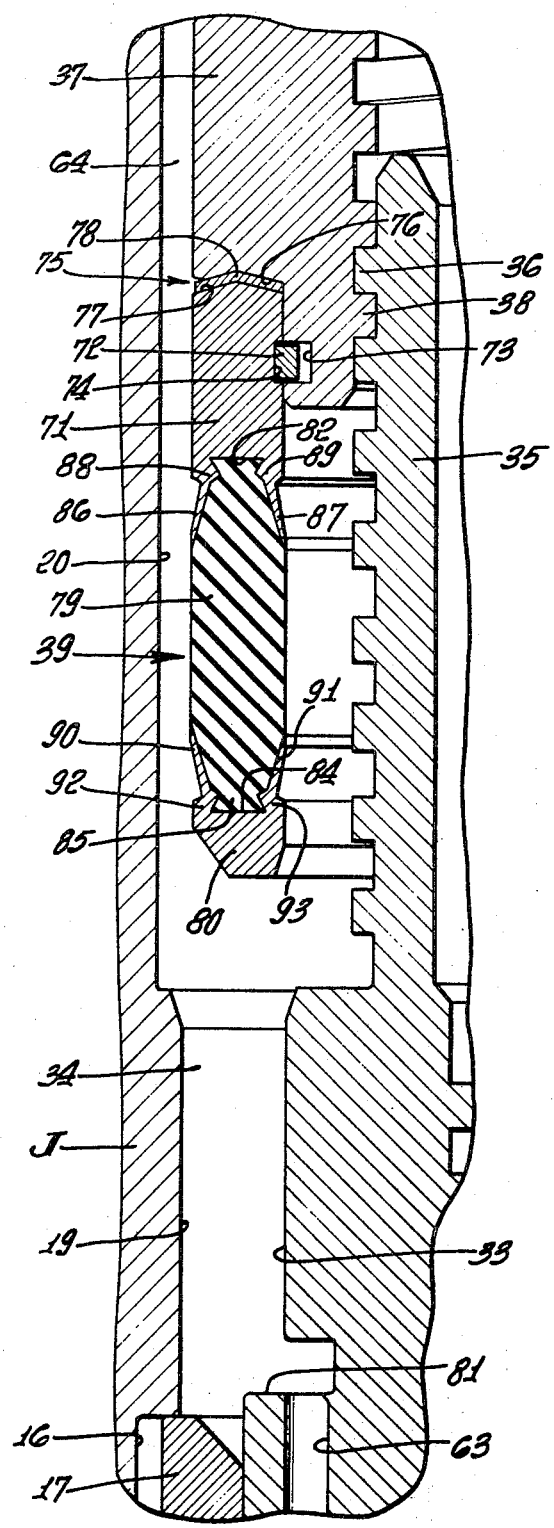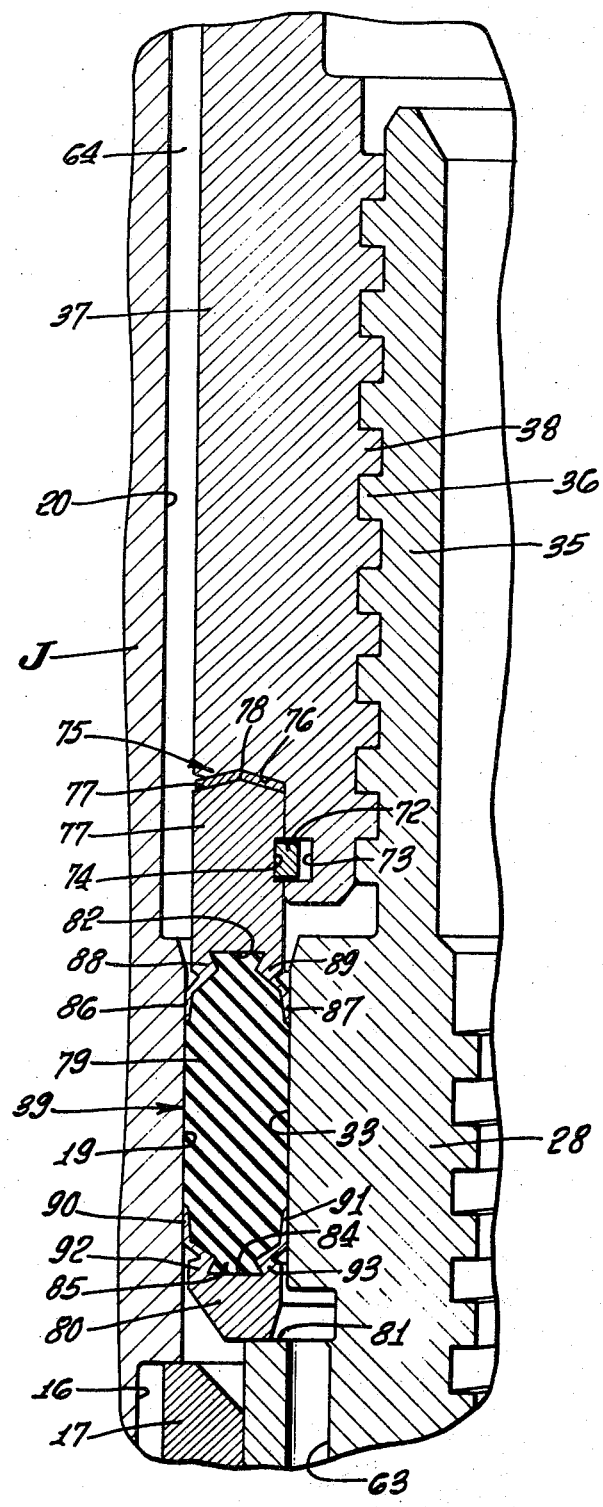

COMBINED METAL AND ELASTOMER SEAL

BACKGROUND OF THE INVENTION

In the drilling of oil and gas wells at an underwater site, different casing strings are hung to protect strata that have been drilled through from the pressures and fluids which may be required or encountered at greater depths. In many cases, a special housing is provided at or near the ocean bottom to support and seal off a casing string cemented in the well bore.

An example of casing hanger apparatus adapted to be lowered through a conductor pipe to the ocean floor and landed in a housing fixed at the bottom of the water is shown and described in U.S. Pat. No. 3,492,026, granted Jan. 27, 1970.

Such casing hanger apparatus and other known casing hanger apparatus use resilient elastomeric seal devices to pack off the annular clearance between the underwater well head housing and the respective casing hangers which are landed in the housing. Such elastomeric seals have included O-ring or side ring seals and deformable or energizable elastomeric seals which are cylinders adapted to be axially compressed to cause lateral or radial deformation of the elastomeric material into engagement with opposed cylindrical walls.

In effecting the pack-off with such energizable seals, the packing element or elastomeric cylinder is subjected to compression only, inasmuch as torque or twisting action is not imposed thereon. The hanger body can e locked in place before the circulating and cementing operations commence, so that assurance is had that the hanger cannot be pumped from its companion seat. The sealing effectiveness can be tested before the running tool and running string are elevated from the hole, so that additional pack-off force can be applied, and if the seal is still leaking, the running tool and running string can be removed and a suitable retrieving tool lowered for the purpose of retrieving the packing structure and then lowering a proper packing structure into place so that a proper seal can be effected. The actuation of the packing structure to effect its seal between the hanger body and the previously installed hanger body therearound can occur simultaneously with the release of the running string.

Such energizable elastomeric packings or seals are generally assembled with a support ring, for example, by the use of bolts extending through the elastomeric body or by other assembly methods which enable the packing ring or seal to be replaced. In those prior structures, however, there is the inherent annular gap, both at the inside and outside periphery of the seal, between the opposed cylindrical body walls and the opposed end rings or the shoulders which are axially moved one toward the other to deform the packing ring. The elastomeric material may flow or extrude into such an annular gap and the sealing effectiveness may be impaired or diminished.

SUMMARY OF THE INVENTION

The present invention provides a packing or seal for underwater casing hanger apparatus, and other apparatus, where a seal is energized between opposing walls and expanded into sealing engagement therewith, the seal comprising means for effecting a metal-to-metal seal with the walls, as well as a resilient or elastomeric seal between the walls.

Further the metal-to-metal seal of th invention provides means for closing or bridging the clearance space inherent in such seals, so as to eliminate extrusion of the resilient, elastomeric material into the gap.

These objectives are accomplished by employing metallic end rings at opposite ends of the cylindrical elastomeric packing or seal, the end rings having oppositely facing expansible lip portions which are deformed into sealing engagement with the opposing walls between which the elastomeric seal is deformed into sealing engagement. These lip portions also provide the means for bridging the usual gap to prevent extrusion of the elastomeric material between the end rings and the walls. The end rings may be of malleable or ductile material or may be of resilient material, such as steel, and the lips may be, in the latter case, resiliently retractable.

In addition, the present invention provides an effective and simple manner of connecting an elastomeric packing or seal ring to a supporting member, without the need for using the usual fastener elements, so that assembly of the packing ring with and disassembly of the packing ring from the supporting member is facilitated. In accomplishing this, the end rings for the packing ring and the ends of the packing ring are constructed so that they are mechanically interlocked with one another. One of the end rings, moreover, is provided with means whereby the packing assembly is rotatably carried by the supporting member, so that the supporting member is rotatable to energize the packing ring without transmitting torque to the packing ring assembly.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such a detailed description is not to be taken in a limiting sense, since the scope of the invention is best defined by the appended claims.

BRIEF DESCRIPTION OF THE DRAWINGS

FIG. 3 is an enlarged fragmentary vertical section, showing the packing in a normal, non-sealing condition; and FIG. 4 is a view corresponding to FIG. 3, but showing the packing in packed-off condition.

DESCRIPTION OF THE PREFERRED EMBODIMENT

Figure 1:
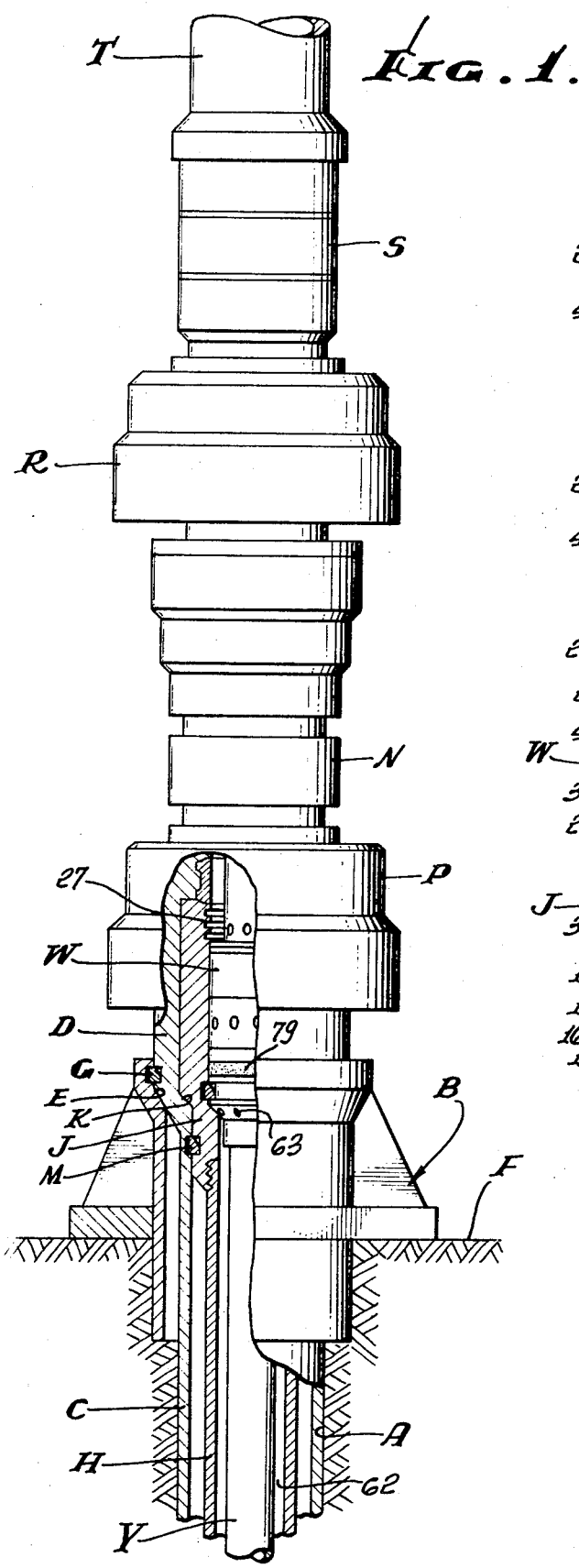
FIG. 1 is a combined side elevation view and longitudinal section of a casing hanger and associated apparatus installed in and in connection with a well bore underlying a body of water.
Figure 2:
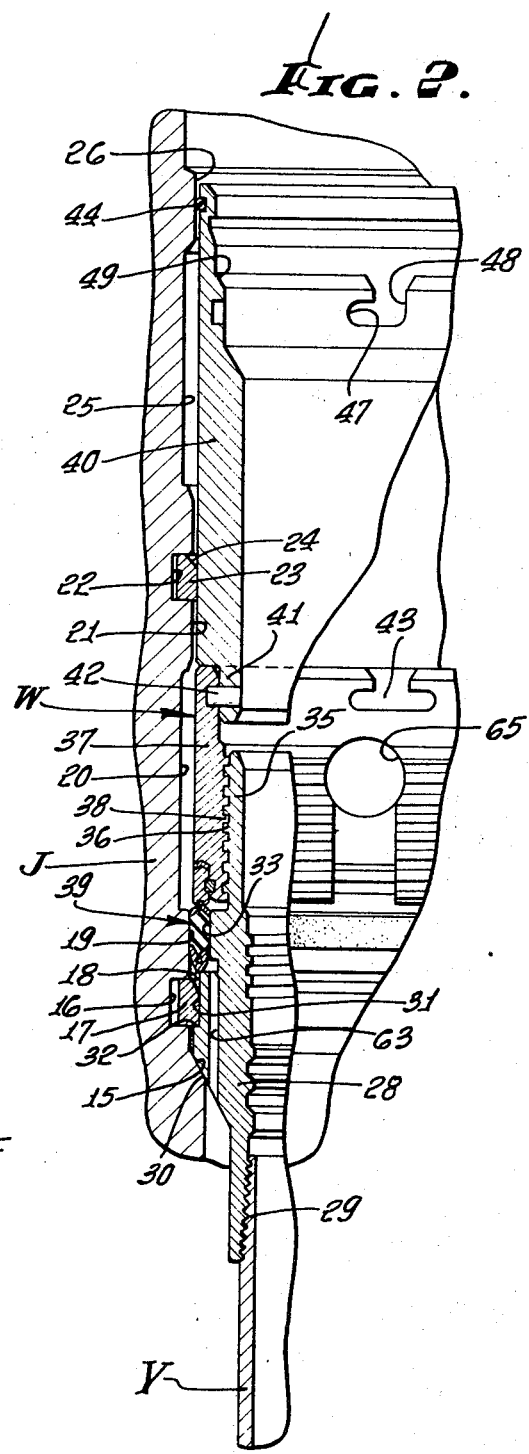
FIG. 2 is a fragmentary vertical section through the casing hanger apparatus, with parts broken away, with the packing energized to a sealing condition.

A typical installation of apparatus embodying the invention is illustrated somewhat diagrammatically in FIG. 1, in connection with a well bore A underlying an ocean or other body of water and extending downwardly from the ocean floor F. A suitable base structure B is supported on the ocean floor and carries an outer casing C of relatively large diameter suspended from a casing hanger body D resting upon an outer seat E on the base and locked thereto by a suitable lock ring G. Disposed within the outer casing is an intermediate string of casing H extending down into the well bore and suspended from a suitable casing hanger body J resting upon a companion tapered seat K in the outer body and suitably locked thereto by a lock ring M. One of a stack of blowout preventers N are connected by means of a suitable connector P, such as the hydraulic connector illustrated in U.S. Pat. No. 3,321,217 for "Coupling Apparatus for Well Heads and the Like," to the head D, the blowout preventer, in turn, being connected by a suitable hydraulic or other connector R to a flexible joint S made of sections secured to a marine conductor pipe T extending to the drilling rig, which may be located on a drilling platform or on a floating vessel or structure. An inner string of casing Y is disclosed in FIG. 1 as having been run into the body J on a casing hanger W which is locked in packed-off condition in the intermediate hanger body J, and it is in connection with the provision of a seal between the casing hanger apparatus W for this inner casing and the casing hanger body J that the present invention is disclosed.

The intermediate hanger body J has a lower downwardly tapering seat or shoulder 15 above which is located an internal circumferential ring groove 16 containing a split inherently contractable lock ring 17 having an upper, inner beveled surface 18. Above the lock ring groove is an internal seal surface 19 of cylindrical form, and above this seal surface is an enlarged internal bore 20 which terminates at another internal cylindrical surface 21 which may be of the same diameter as the seal surface 19. Another internal circumferential groove 22 opens inwardly in the cylindrical surface 21 and contains a split inherently contractable lock ring 23 having an upper inner beveled surface 24 for locking in place a subsequently run device (not shown) such as a production tubing hanger. Above the cylindrical surface 21, the outer hanger body has another enlarged bore 25, and above this enlarged bore, the body J has another internal cylindrical surface 26 above which is provided a suitable internal thread 27 in the hanger body J by which the hanger is run into position on a running tool, as is well known.

The casing hanger apparatus W includes a body 28 having a lower hanger thread 29 connected to the casing Y suspended therebelow. This body has a downwardly facing tapered seat 30 adapted to engage the upwardly facing seat 15 in the surrounding hanger body J. Above the seat 30 is a reduced external diameter portion 31 providing an upwardly facing shoulder 32 engageable with the lower end of the lock ring 17 when the hanger body is moved past the lock ring, during which time the latter is expanded outwardly within its internal groove 16, then contracting partially inwardly and across the shoulder 32 so as to lock the hanger body 28 in place by preventing its upward movement.

Above the lock shoulder 32 is a reduced diameter, external, cylindrical seal surface 33 which is disposed opposite the internal seal surface 19 of the surrounding hanger body J and in radially spaced relation therewith, when the hanger body comes to rest upon its companion seat, to provide an annular passage 34. Above this seal surface 33, the hanger body has a reduced external diameter portion 35 provided with a right-hand thread 36 to which is adjustably and threadedly secured a packer actuating sleeve 37 having an internal thread 38 meshing with the right-hand thread 36. This packer actuating sleeve supports and will also exert an axial force against a pack-off assembly 39 so as to shorten the latter and compress it between the opposed sealing surfaces 19, 33, in accordance with the invention, as described hereinbelow.

The actuator sleeve 37 is connected to a seat protector 40 thereabove, which has a reduced diameter portion 41 piloted within the sleeve. The seat protector has a plurality of circumferentially spaced radial torque pins 42 extending into inverted T-shaped slots 43 in the sleeve 37. The seat protector carries an external seal ring 44 at its upper portion, which is adapted to seal against the internal cylindrical surface 26 of the surrounding hanger body J and this seat protector is adapted to be connected to a torque tube or sleeve forming part of the running and actuating tool (not shown herein, but shown and described in the aforementioned U.S. Pat. No. 3,492,026) by means of a plurality of circumferentially spaced coupling of J-slots 47 in the seat protector 40. The vertical legs 48 of the J-slots open upwardly through an upwardly facing shoulder 49 of the seat protector.

When the hanger apparatus W and the casing Y suspended therefrom is connected to a running tool and lowered through the marine conductor pipe T and the equipment connected therebelow to the position illustrated in FIG. 3, in which the hanger body 28 rests upon its seat 15 and the lock ring 17 has contracted over the upwardly facing shoulder 32, a by-pass circulating passage exists between the hanger apparatus W and the surrounding hanger body J including the annular space 34. As shown, this by-pass communicates with the annulus 62 in the well bore surrounding the suspended casing Y and includes a plurality of circumferentially spaced longitudinal fluid passages 63 extending through the hanger body to the annular passage 34 between the opposed seal surfaces 19, 33. Fluid can then pass upwardly through the annular space 64 between the pack-off assembly and the enlarged bore 20 of the external casing hanger, and thence inwardly through a plurality of fluid by-pass holes 65 formed through the upper portion of the actuator sleeve 37 to the interior of the latter and, thence, to the surface rig, all as more particularly shown and described in the aforementioned U.S. Pat. No. 3,492,026.

The packer assembly 39 includes an upper or support ring 71 secured to the lower portion of the threaded packing actuator sleeve 37 by means of a swivel. Such swivel includes a split retainer ring 72 mounted in an external groove 72 in the nut or sleeve 37 and an internal groove 74 in the support ring 71. A thrust bearing 75 is provided between the actuator sleeve 37 and the support ring 71 so that the sleeve can be rotated without rotating the ring 71. As shown, the thrust bearing includes an upper, inverted conical surface 76 on the threaded sleeve 37 and a lower complemental ridge 77 on the upper end of the ring 71, a teflon bushing or bearing 78 being disposed between the surface 76 and the ridge 77 to allow the sleeve 37 to rotate without rotating the upper support ring 71.

In accordance with the invention, the lower end of the support ring 71 engages and supports the upper end of a cylindrical, resiliently deformable packing ring 79 made of an elastomeric material, such as rubber or rubber-like compound, the lower end of this packing ring 79 engaging and supporting a lower, abutment ring 80 which is adapted to engage an upwardly facing shoulder 81 on the hanger body 28 below its seat surface 33, when the actuator sleeve or nut 37 is threaded downwardly from the position of FIG. 3 to the position of FIG. 4, to seat the seal in a packed-off condition.

Referring to FIGS. 3 and 4, it will be best seen that the upper or support ring 71 is provided with a downwardly opening, undercut or dovetailed groove 82 in which the elastomeric packing 79 has a complemental end flange 83 interfitting to retain the ring 71 and the packing 79 assembled. The elastomeric ring may be molded into the support ring 71 or they may be pressed together, but in either case, the packing ring 79 is supported on the actuator sleeve or nut 37 by the support ring 71. Correspondingly, the lower or abutment ring 80 has an upwardly facing, undercut or dovetailed groove 84 receiving a complemental lower flange 85 on the packing sleeve 79. Thus, the upper and lower rings 71 and 80 and the packing ring 79 are mechanically held in assembly without the usual fasteners, and the swivel lock ring 72 enables the unitized packing assembly to be easily installed on the actuator nut 37.

In accordance with another feature of the invention, means are provided for effecting a metal-to-metal seal between the packing means 39 and the hanger bodies J and 28. In the illustrated embodiment, such means are incorporated in the respective end rings 71 and 80. More particularly, as best seen in FIGS. 3 and 4, the upper support ring 71 has opposed annular lips 86 and 87 projecting downwardly and divergently from marginal flanges 88 and 89 at the respective outer and inner peripheries of the support ring 71 which define the undercut groove 82. These lips 86 and 87 engage complemental, upwardly convergent side walls of the packing ring 79 and are normally spaced inwardly to clear the opposed cylindrical seal surfaces 19 and 33 when the packing ring 79 is moved downwardly, as will be hereinafter described. Correspondingly, at the lower end of the packing ring 79, the abutment ring 80 has opposed annular lips 90 and 91 projecting upwardly and divergently from marginal flanges 92 and 93 at the respective outer and inner peripheries of the abutment ring 80 which define the under groove 84. These lips 90 and 91 engage downwardly convergent side walls of the packing ring 79 and are, like the lips 86 and 87, normally spaced inwardly to clear the opposed sealing walls 19 and 33 when the packing ring 79 is moved downwardly.

The rings 71 and 80 may be composed of malleable material or of resilient or spring steel adapted to be deformed outwardly into circumferential sealing contact with the sealing walls 19 and 33, as seen in FIG. 4, when the packing ring or sleeve 79 is radially deformed by axial compression. Compression of the packing ring 79 and radial deformation of the latter, as well as radial deformation of the lips 86,87 and 90,91 is accomplished by movement of the actuator sleeve or nut 37 axially from the position shown in FIG. 3 to the position shown in FIG. 4. To shift the actuator sleeve 37 downwardly it is rotated by a running tool (not shown) which engages in the J-slots 47 of the seat protector 47, so that the threads 36 and 38 on the actuator sleeve and on the hanger body 28, respectively, cause the actuator sleeve to move in a sealing direction, the support ring 71 remaining non-rotative due to the swivel connection provided by the ring 72.

When the packing sleeve 79 is moved downwardly to the position that the abutment ring 80 seats on the shoulder 81, progressive further downward movement of the actuator sleeve causes axial compression of the elastomeric packing sleeve 79 with resultant radial or lateral expansion in both directions, thereby forcing the lips 86,87 and 90,91 into initial peripheral engagement with the sealing surfaces 19 and 33. Such engagement of the metallic lips with the sealing surfaces provides barriers bridging the spaces or gaps between the end rings 71 and 80 and the sealing walls 19 and 33 so as to prevent the elastomeric material of the packing ring 79 from extruding through or into such spaces or gaps. Further compression of the elastomeric ring 79 deforms it into right resilient sealing engagement with the sealing walls 19 and 33 and also firmly forces the metal lips 86,87 and 90,91 into tight metal-to-metal sealing and gap bridging engagement with the sealing surfaces 19 and 33.

The seal means thus is compound, consisting of both metal-to-metal lip seals facing in opposite directions and an intermediate resilient elastomeric seal provided by the packing ring, the deformation of which serves to hold the lip seals in sealing engagement with the sealing surfaces of the casing hanger apparatus.

We claim:

1. In combination: a vertical outer body member having an internal cylindrical sealing surface; a vertical inner body member within said outer body member and having an external cylindrical sealing surface; said inner member being radially spaced from said outer member to define an annular space between said sealing surfaces; one of said body members having an abutment; supporting means on said inner member and movable longitudinally toward said abutment; a packing assembly carried by said supporting means, said packing assembly comprising a packing sleeve of elastomeric material, an upper one-piece metallic ring carried by said supporting means, means securing said ring directly to the upper end portion of said packing sleeve; a lower one-piece metallic ring, means securing said lower ring directly to the lower end portion of said packing sleeve, said lower ring being supported wholly by said packing sleeve, each of said rings including inner and outer lip seals extending circumferentially around the inner and outer surfaces of said packing sleeve, said inner and outer lip seals of said rings confronting each other, said packing sleeve and inner and outer lip seals of both rings being adapted to be disposed in said annular space between said sealing surfaces; and means for moving said supporting means and packing assembly carried thereby longitudinally toward said abutment to engage said lower ring with said abutment and then shift said upper ring toward said lower ring to shorten and compress said packing sleeve therebetween and expand said sleeve into sealing engagement with said internal and external surfaces and to cause said packing sleeve to expand said inner and outer lip seals of both rings into bridging and metallic sealing engagement with said external and internal surfaces, respectively.

2. In a combination as defined in claim 1, said means securing said upper ring to said packing sleeve comprising an undercut groove in said upper ring receiving said upper end portion of said packing sleeve; said means securing said lower ring to said packing sleeve comprising an undercut groove in said lower ring receiving said lower end portion of said packing sleeve.

3. In a combination as defined in claim 1; said means securing said upper ring to said packing sleeve comprising a dovetailed groove in said upper ring receiving a complemental flange of said upper end portion of said packing sleeve; said means securing said lower ring to said packing sleeve comprising a dovetailed groove in said lower ring receiving a complemental flange of said lower end portion of said packing sleeve.

4. In well bore casing apparatus: a vertically disposed outer body having an internal cylindrical sealing surface; a vertically disposed inner body supported by said outer body and having an external cylindrical surface opposed to and laterally spaced from said internal surface to form an annular space therebetween; one of said bodies having an abutment below its sealing surface; supporting means on said inner body member movable downwardly toward said abutment; a packing assembly secured to said supporting means and movable downwardly into said annular space, said packing assembly comprising a packing sleeve of elastomeric material, an upper one-piece metallic ring carried by said supporting means, means securing said ring directly to the upper end portion of said packing sleeve, a lower one-piece metallic ring, means securing said lower ring directly to the lower end portion of said packing sleeve, said lower ring being supported wholly by said packing sleeve, each of said rings including inner and outer lip seals extending circumferentially around the inner and outer surfaces of said packing sleeve, said inner and outer lip seals of said rings confronting each other, said packing sleeve and inner and outer lip seals of both rings being dimensioned initially to move freely downwardly within said annular space for disposition between said sealing surfaces; and means for moving said supporting means and packing assembly carried thereby downwardly toward said abutment to engage said lower ring with said abutment and then shift said upper ring toward said lower ring to shorten and compress said packing sleeve therebetween and expand said sleeve into sealing engagement with said internal and external surface and to cause said packing sleeve to expand said inner and outer lip seals of both rings into bridging and metallic sealing engagement with said external and internal surfaces, respectively.

5. In apparatus as defined in claim 4; said means securing said upper ring to said packing sleeve comprising an undercut groove in said upper ring receiving said upper end portion of said packing sleeve; said means securing said lower ring to said packing sleeve comprising an undercut groove in said lower ring receiving said lower end portion of said packing sleeve.

6. In apparatus as defined in claim 4; said means securing said upper ring to said packing sleeve comprising a dovetailed groove in said upper ring receiving a complemental flange of said upper end portion of said packing sleeve; said means securing said lower ring to said packing sleeve comprising a dovetailed groove in said lower ring receiving a complemental flange of said lower end portion of said packing sleeve.

* * * * *